Oct. 20, 1970     A. C. SCHOUW     3,535,235

FILTER APPARATUS

Filed Nov. 22, 1967     2 Sheets-Sheet 1

INVENTOR
ARTHUR C. SCHOUW

Oct. 20, 1970  A. C. SCHOUW  3,535,235
FILTER APPARATUS
Filed Nov. 22, 1967  2 Sheets-Sheet 2

INVENTOR
ARTHUR C. SCHOUW

United States Patent Office 3,535,235
Patented Oct. 20, 1970

3,535,235
FILTER APPARATUS
Arthur C. Schouw, Owosso, Mich., assignor to Tri-Mer Corporation, Owosso, Mich., a corporation of Michigan
Filed Nov. 22, 1967, Ser. No. 685,031
Int. Cl. B01d 23/24
U.S. Cl. 210—30         30 Claims

ABSTRACT OF THE DISCLOSURE

A series of filter packs are mounted in a housing so that a fluid introduced at the upper end of the housing flows successively through each of the packs. Each filter pack comprises a fluid pervious shell containing a bed of chargeable, polymer particles which separate ionic particles from the fluid by means of electrostatic attraction. The filler particles in each pack are chosen to attract particles of a different predetermined size or density from the fluid.

Cleaning means are disclosed for introducing a cleaning fluid through each filter pack in a direction tangential to normal fluid flow through the pack to remove the filtered particles from the filtering particles.

One embodiment discharges the cleaning fluid from each bed to a common sump. A second embodiment discharges the cleaning fluid from each bed to an individual sump so that the filtered particles can be collected in an unmixed state.

BACKGROUND OF THE INVENTION

Field of the invention

This invention relates to filter apparatus and more specifically to an apparatus for electrostatically separating ionic particles from a fluid by introducing the fluid through a series of filter chambers each having means for attracting particles of a selected size and including means for cleaning an electrostatic bed of filtering beads by introducing a cleaning fluid through the bed in a tangential direction relative to normal fluid flow.

Description of the prior art

It is often necessary to provide means in fluid systems for cleaning a filter means in place as the filter becomes clogged with the soils that are being removed from the fluid in the system. One form of filter means that is widely employed in fluid systems comprises a pack containing a bed of relatively small filtering elements such as beads having a size related to the soils that are being filtered. The fluid is drained through the pack with the beads separating the soils from the fluid due to the predetermined porosity of the pack. One application employing this type of filter is in the purification of polluted water. Another application is in the recovery of soils having a relatively high value from a waste fluid.

One problem associated with filter packs is related to the means for automatically cleaning the beads when they accumulate filtered soils and form a cake. The conventional approach is to introduce a backwash fluid through the pack in a direction opposite to the normal fluid flow in order to break up the cake. The contaminates and the backwash fluid are then drained from the pack so that with the beads assuming their unclogged state. The deficiency with this approach is that the beads tend to become oriented in directions parallel to the fluid flow through the pack, since the normal flow and the backwash flow are along a common axis but in opposite directions. The result is that the pack is not completely cleaned by the backwashing cycle. One of the purposes of the present invention is to provide means for more effective cleaning filter packs composed of minute beads or particles.

Conventionally filter packs are adapted to remove particles of different sizes from a fluid by varying the size of the filtering beads. Larger beads form a bed having a porosity for collecting larger particles and smaller beads are used to form a bed having a smaller porosity to collect finer particles.

It is another purpose of the present invention to provide an improved multiphase filtering system wherein the fluid is delivered through a series of filter packs each having beads for removing selected particles from a fluid by electrostatic attraction.

SUMMARY

The preferred embodiment of the present invention constitutes a filter apparatus for purifying polluted or contaminated water. It is to be understood, however, that the invention can also be incorporated in systems for purifying contaminated oils, for recovering valuable soils from fluids and the like.

A fluid system delivers the polluted water to a housing having upper and lower filter packs mounted between inlet and discharge openings. The water is delivered through the inlet at the upper end of the housing, drains through the upper filter pack, the lower filter pack and then flows from the discharge opening in a purified state.

Each filter pack is replaceable and comprises a fluid pervious shell partially filled with filtering beads. The filtering beads are characterized by the property of becoming induced with a charge by the fluid being filtered and in their charged state they remove by electrostatic means particles from the filtered fluid. Preferably the filtering particles are formed of a polymer such as polyvinylchloride. The polymers are selected so that the particles in each bed attract particles of a given contaminate or material from the fluid. Thus, the upper filter pack will separate a portion of the contaminates from the contaminated water and the lower filter pack will separate a different category of contaminates from the water. The nature of the charge associated with the beads of a given filter pack is a function of the bead material, the density of the bead material, the nature of the filter particles and the nature of the filtered fluid. Thus, a multi-phase system can be formed of a series of packs with each pack separating a different component from a multi-component fluid by electrostatic means without an outside source of power for energizing the beads to their excitation potential.

The beads in each of the filter packs have a specific density of about 70% of the fluid that is being filtered so that they tend to float in the filtered fluid. The beads are chosen so that if water is being filtered, the specific gravity of the beads is about 70%. If an oil is being filtered, the beads are chosen so that their density is in proportion to this 70% ratio.

As the packs accumulate the filtered particles from the water, they gradually assume a clogged condition. This clogged condition is reflected in a pressure increase upstream of the filter pack and within the housing. A pressure-responsive control system introduces a cleaning fluid through the filter packs when the pressure increase reaches a predetermined level. In addition the cleaning fluid is introduced through the filter packs at timed intervals regardless of whether the filter is purifying water. This is because when the system is employed for purifying polluted water, bacteria tend to build up unless they are periodically washed from the filters.

The cleaning fluid is introduced into the bed of filtering beads in each pack simultaneously in two directions on two different flow paths, one being radially outward from a central location and the other being tangential to the walls of the chamber confining through the bed. Thus the normal flow of the polluted water is generally downwardly through each pack, and the cleaning fluid is delivered tangentially and in a generally horizontal direction. Each pack is only partially filled with beads so that a slurry is created by the cleaning fluid. This slurry coupled with the natural tendency of the particles to rise in the cleaning fluid because of their specific density causes the filter cake to break up and the soils to separate from the filtering beads.

One preferred filter employs a housing in which the upper and lower filter packs are fluidly separated during the cleaning step. The cleaning fluid from each filter pack is discharged to a different sump so that the soils are removed in an unmixed state. Another form of preferred filter removes the cleaning fluids in a mixed state to a common sump.

Thus, it can be seen that the preferred embodiment of the invention provides a novel multi-phase filtering process, each phase separating by electrostatic means a selected category of soils from a solution of the soils. In addition the preferred filter apparatus has improved means for automatically cleaning, in place, a filtering means composed of a bed of filtering beads by introducing a cleaning fluid through the bed in a direction tangential to normal fluid flow. This novel cleaning arrangement agitates and slurries the bed so that the soils can be readily separated from the filtering beads and then removed from the bed when the cleaning solution is discharged from the filtering housing.

It is therefore an object of the present invention to provide an improved filter apparatus for removing selected particles from a solution of the particles by electrostatic charges.

It is another object of the present invention to provide improved means for recovering mixed ionized particles from a liquid by providing a filter apparatus having a series of chargeable filtering means, each of the chargeable filtering means being charged by the flow of the filtered fluid and adapted to separate a selected category of the mixed ionized particles from the liquid.

Another object of the present invention is to provide improved means for cleaning a filtering pack composed of a bed of beads by providing means for introducing a cleaning solution through the beads in two different and simultaneous flow paths moving generally horizontally through the bed.

Still another object of the invention is to provide an improved cleaning means of the above character which uses a pressure assist to expand the bed during the cleaning.

Still further objects and advantages of the present invention will readily occur to one skilled in the art to which the invention pertains upon reference to the following detailed description.

DESCRIPTION OF THE DRAWINGS

The description refers to the accompanying drawings in which like reference characters refer to like parts throughout the several views and in which.

DESCRIPTION OF THE PREFERRED EMBODIMENTS

Figure 1:
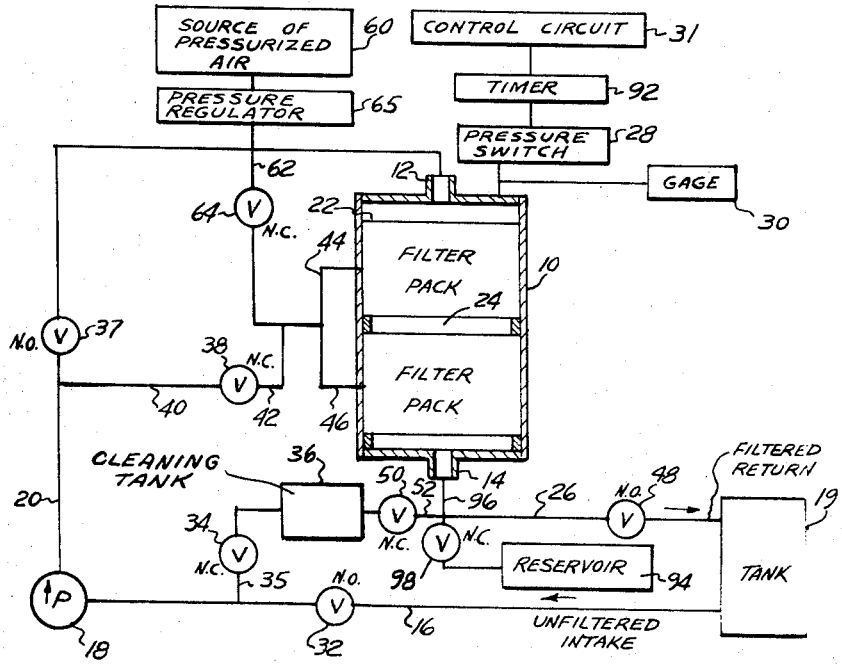
FIG. 1 is a diagrammatic illustration of a filtering system incorporating the preferred embodiment of the present invention.

Now referring to FIG. 1, a preferred filter system is described for purifying contaminated water and comprises a filter housing 10 having an upper inlet 12 and a lower discharge opening 14. The contaminated water is normally delivered through a conduit 16 by a pump 18 from a tank 19. The out-put of the pump is through a conduit 20 into the inlet 12 of the housing. The water drains downwardly through an upper filter pack 22, a lower filter pack 24, the discharge opening 14 and a drain conduit 26 where it is returned in a purified state to the tank 19.

The filter packs 22 and 24 tend to assume a clogged condition over a period of time. This clogged condition is reflected in a pressure increase upstream of the upper filter pack 22. This pressure increase is sensed by a pressure switch 28 and a pressure gauge 30. The pressure switch 28, through an electrical control circuit 31 causes a normally open valve 32 in the inlet conduit 16 to close so that the flow of the contaminated water is temporarily terminated while a normally closed valve 34 in a conduit 35 is opened to permit a cleaning solution to be delivered from a cleaning tank 36 into the housing 10. A normally open valve 37 in the conduit 20 is closed and a normally closed valve 38 in a bypass conduit 40 is opened so that the cleaning solution is delivered to a conduit 42 and then divided for delivery to the upper filter pack 22 by a conduit 44 and to the lower filter pack 24 through a conduit 46. During this cleaning step, a normally open drain valve 48 in the drain conduit 26 is closed and a normally closed valve 50 in a return conduit 52 opened so that the cleaning solution and the contaminator return to the cleaning tank 36.

A source of pressurized air 60 is connected by a conduit 62 to the cleaning conduit 42 in order to admit a mixture of water and air into the upper and lower filter packs 22 and 24 during the cleaning cycle. The admission of the compressed air is controlled by a normally closed valve 64 and a pressure regulator 65 diposed in conduit 62.

Figure 2:
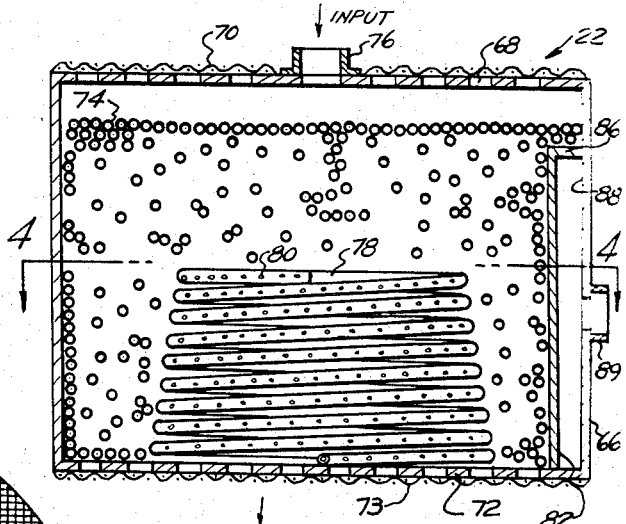
FIG. 2 is a sectional view through a preferred filter pack separated from its housing.
Figure 3:
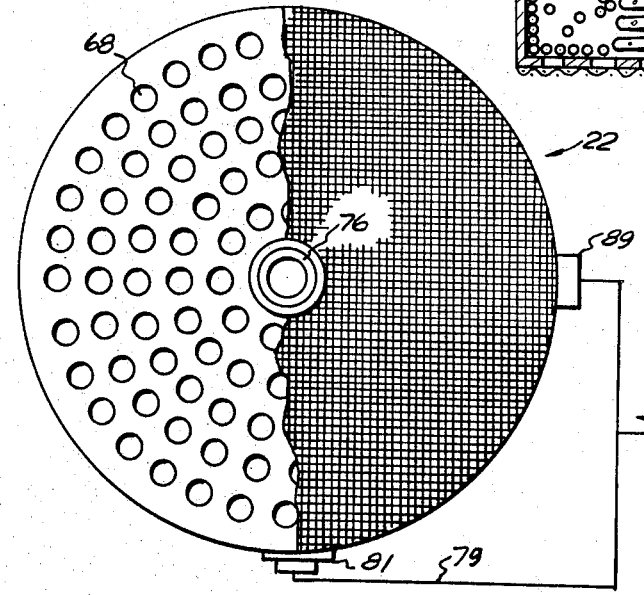
FIG. 3 is a plan view of the preferred filter pack.
Figure 4:
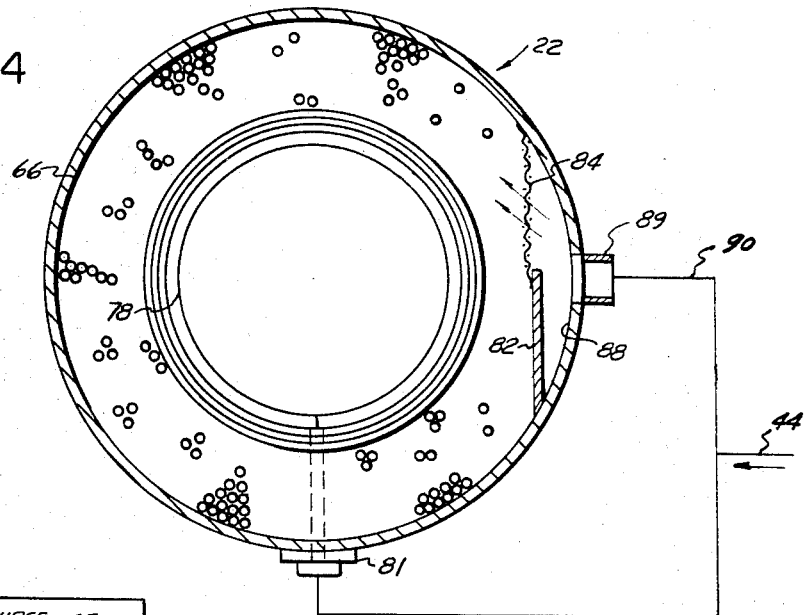
FIG. 4 is a view taken along lines 4—4 of FIG. 2.

Now referring to FIGS. 2, 3 and 4, an enlarged view of the upper filter pack 22 is illustrated for purposes of description. The upper and lower filter packs 22 and 24 are similar to one another with the exception that the plastic filtering beads in each pack is adapted to attract a different category of contaminates from the water.

The filter pack 22 comprises a substantially cylindrical shell 66 preferably formed of a mesh of polyvinylchloride. A perforated cap 68 closes off the upper end of the shell 66. A stainless steel mesh 70 overlays the cap 68 and the mesh permitting the free flow of water downwardly through the shell 66. A perforated bottom member 72 and a mesh 73 close off the bottom of the shell 66 so that a fluid pervious container is formed for containing a bed 74 of filtering beads. The shell 66 is only partially filled with the beads so that when the cleaning solution and pressurized air are introduced into the bed, a slurry is created.

The bed 74 is preferably formed of a particulate substance such as beads of a polymer having a specific gravity of about 70%. The beads are selected of a polymer which develops a charge by the flow of the water so that the charged beads attract particles in the water. Preferably the bed in the upper filter pack 22 is formed of beads of a polyvinylchloride and the beads in the lower filter pack 24 are formed of polymethylmethacrylate. The size of these beads are of about 40 to 60 mesh. It is to be understood that the shell 66 and the upper and lower mesh members 70 and 73 closing the shell are formed of a finer mesh than the size of the beads so that the beads are contained in their respective beds. A fitting 76 mounted on the cover 68 provides means for receiving the contaminated water into the bed 74.

To eject cleaning fluid into the bed along radially outward paths from a central location in the interior of the bed (FIG. 2), a spiral, helical, tubular member 78 is mounted within the shell 66, is preferably formed of a polyvinylchloride with a series of openings 80 throughout its length. The openings 80 are smaller than the beads in the bed 74, however, the openings 80 could be formed larger than the bead size with a sock formed of a polyethylene cloth wrapped around the tubular member 78 in order to prevent the beads from clogging the openings 80. A fitting 81 on the shell connects the tubular member 78 to the conduit 44 through a conduit 79 so that the cleaning mixture of air and water can be introduced into the tubular member to agitate the beads. The flow out of the member 78 forms an outwardly moving wall having the shape of a truncated cone, since that is the overall shape of the spiraled member 78.

As can best be seen in FIGS. 2 and 4, a partition plate 82 and a screen element 84 with a short plate member 86 cooperate to form a chamber 88 in the shell 66. Preferably the partition plate 82 and the screen 84 are in a plane parallel to the axis of the shell 66 and are joined together halfway between their intersections with the shell. A fitting 89 and a conduit 90 provide means for introducing the cleaning solution from the conduit 44 into the chamber 88 simultaneously with the introduction of fluid into tubular member 78.

As can best be seen in FIG. 4, a cleaning solution introduced into the chamber 88 is directed through the screen 84 in a direction generally tangential with respect to the cylindrical shell 66 and in a direction substantially horizontal through the bed 74. The cleaning solution creates a slurry of the filter bed so that the beads are broken up and separated from the contaminates which are then discharged through the discharge conduit 14 with the cleaning solution. This cleaning cycle is assisted by the natural tendency of the beads in the cleaning solution to rise because of their low specific gravity.

The lower filter pack 24 has a construction similar to the upper filter pack with the exception that the beads contained in the filter packs are adapted to attract a different category of contaminants from the water.

The valves 34, 38, 50 and 64 are closed and the valves 32, 37 and 48 are open during normal operation of the filter. When the pressure switch 28 senses a predetermined pressure increase on the upstream side of the filter packs caused by either of the filter packs 22 or 24 assuming a clogged condition, the control current 31 automatically shift the valves to their alternate positions so that the valves 34, 38, 50 and 64 assume an open condition and the valves 32, 37 and 48 assume a closed position to admit the cleaning water into the housing 10 where it is introduced into the beds 74 of both filters in a generally tangential direction to normal fluid flow. This cleaning phase continues for a predetermined time by a timer (not shown). The valves are shifted at the end of the cleaning cycle toward their normal alternate position so that the filtering operation can be resumed.

A second timer 92 in the circuit is programmed to over-ride the pressure switch 28 and provides time control means for automatically initiating a cleaning operation even though the filtering cycle has not taken place. This automatic cleaning operation occurs at regular time intervals such as eight hours so that when the system is closed down for a period of time such as a weekend, bacteria which tend to accumulate in the filter packs are flushed out by means independent of a pressure build-up.

A reservoir 94 is connected through a conduit 96 to the discharge opening 14 and provides means through a normally closed valve 98 for drawing off the cleaning solution when the soils removed from the filtering beads are to be separated from the cleaning solution.

Figure 5:
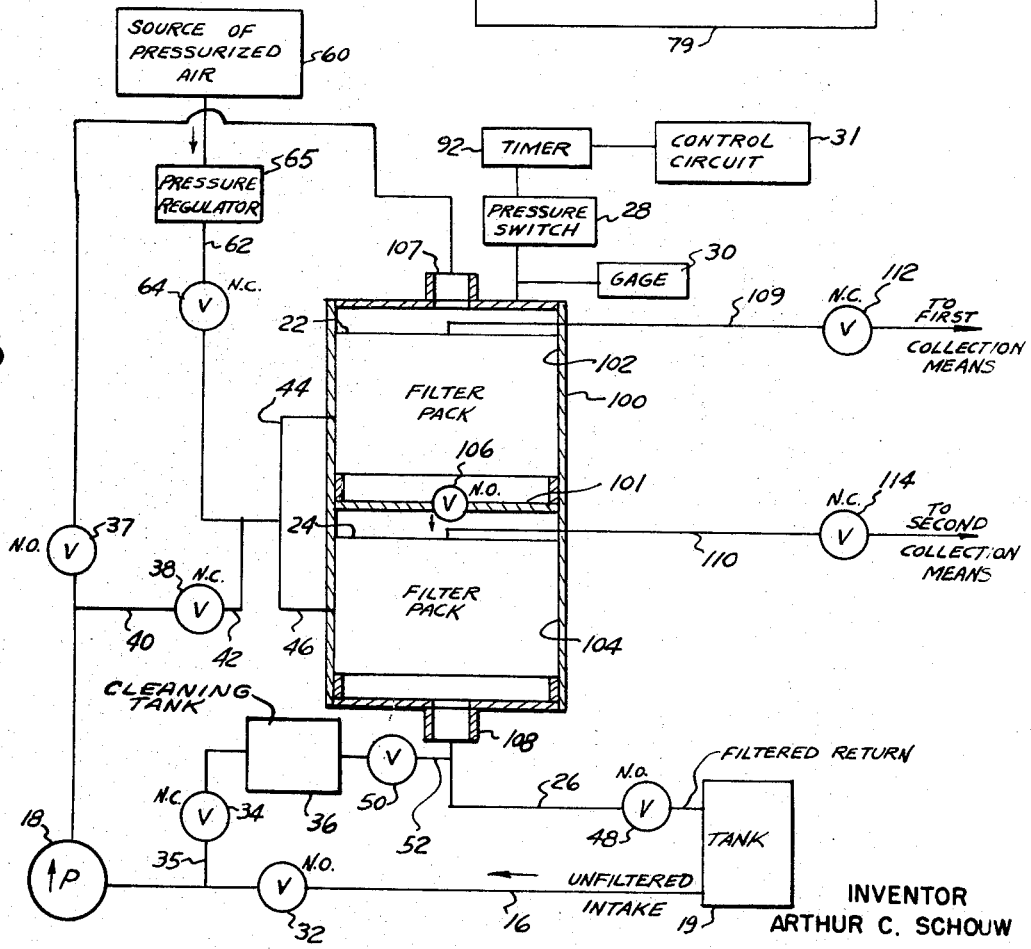
FIG. 5 shows a fluid filter system for discharging the backwash fluid from each filter pack to individual collection means.

Now referring to FIG. 5, another embodiment of the invention is shown which is similar to the system illustrated in FIG. 1, with the exception that the filter housing 10 has been replaced by a housing 100 having a partition 101. The partition 101 divides the housing 100 into an upper filter chamber 102 and a lower filter chamber 104. Fluid communication between the upper and lower chambers is controlled by a valve 106. Normally, the valve 106 is open so that the water drains through an upper inlet 107, down through the filter pack 22, the open valve 106, the lower filter pack 24 and out through an outlet 108. During the cleaning operation, the valve 106 is automatically closed so that the cleaning solution through the upper filter pack 28 is discharged through a conduit 109 to a first collection means and the cleaning solution through the lower filter pack is discharged through a conduit 110 to a second collection means. In this form of the invention a normally closed valve 112 in the conduit 109 and a normally closed valve 114 in the conduit 110 are opened during the cleaning cycle. This embodiment permits the particles separated by each of the filter packs 22 and 24 from the filtered fluid to be removed from the housing 100 in an unmixed form for recovery purposes.

In conclusion it is to be understood that I have described in detail an apparatus and a method for separating particles from a fluid in a multistage filtering apparatus. The filter means comprise a series of packs of beads which are charged by the flow of the filtered fluid and means for automatically cleaning the beds in place by a cleaning solution introduced in two different and simultaneous directions substantially horizontal through the packs. Each pack has beads adapted to attract ionic materials of a selected size or material.

Although I have described two embodiments of my invention, it is to be understood that various changes and revisions can be made therein without departing from the spirit of the invention as expressed in the scope of the appended claims.

Having described my invention, I claim:

1. A system for separating first and second particles from a contaminated fluid, said first and second particles having the property of being attracted by electrostatic charges, said system comprising
   (a) housing means having a fluid inlet and a fluid outlet and first and second filter chambers defined by curved walls and located between said inlet and said outlet;
   (b) first filtering beads defining first bed partially filling said first filter chamber, which beads develop an electrostatic charge upon passage of said fluid therethrough;
   (c) second filtering beads defining a second bed partially filling said second filter chamber, which second beads develop an electrostatic charge upon passage of said fluid therethrough; said second beads formed of material different from said first beads;
   (d) means for delivering a fluid containing a mixture of said first and second particles into said first filter chamber wherein said electrostatic charges separate said first particles from said fluid;
   (e) means for then delivering said fluid into said second filter chamber wherein said electrostatic charges separate said second particles from said fluid;
   (f) means for then discharging said fluid from said second filter chamber and through said outlet; and
   (g) means for removing said first particles from said first filter chamber and said second particles from said second filter chamber, said removing means including first ejecting means in each of said beds for ejecting cleaning fluid into said beds outwardly from a central location, said beads in said beds having a specific gravity which is less than that of said cleaning fluid, and second ejecting means in each of said beds for simultaneously ejecting fluid into said beds in a generally tangential direction to the walls of the chambers for said each bed.

2. A system as defined in claim 1, including means for separating said first particles from said first beads and for separating said second particles from said second beads and means for removing said first and second separated particles from their respective filter chambers.

3. A system as defined in claim 1, including means for separating said first particles from said fiirst beads and removing said first particles from said housing means, and means for separating said second particles from said second beads and for removing said second particles from said housing means.

4. A system as defined in claim 1, including first means for separating said first particles from said first beads and removing same from said first filter chamber and second means for separating said second particles from said second beads and removing same from said second filter chamber without mixing said first and second particles.

5. A system as defined in claim 1, wherein first beads comprises first filter particles of a first chargeable polymer and said second beads comprises second filter particles of a second chargeable polymer.

6. A system as defined in claim 5, wherein said first beads comprise particles of polyvinylchloride and said second beads comprise particles of polymethylmethacrylate.

7. A system as defined in claim 1, including means for fluidly separating said first and second chambers.

8. A system as defined in claim 1, wherein said first chamber is above said second chamber, and the inlet of said housing is above said first chamber and the outlet of said housing is below said second chamber, said fluid normally being introduced through said housing inlet and flowing downwardly through said first and second chambers, respectively, and through said outlet.

9. A system as defined in claim 1, wherein the specific density of said beads is about 70% of the density of said contminated fluid.

10. A system as defined in claim 9, wherein said fluids comprise water solutions, 11. The system as defined in claim 1, wherein said outward ejection by said first ejecting means is directed on radial paths of said beds.

12. The system as defined in claim 11, wherein said first ejecting means includes a perforated tube spiraled in the axial direction of said bed.

13. The system as defined in claim 12, wherein said spiraled tube forms a truncated cone in its overall outline.

14. The system as defined in claim 1, wherein said second ejecting means includes a vertical partition extending substantially the full height of said bed, said partition having perforations in a portion thereof.

15. The system as defined in claim 14, wherein said partition extends along one side of said bed spaced apart from said first ejecting means, said partition comprising a solid wall for one half its width, and a wire screen the other half.

16. The system as defined in claim 15, wherein said second ejecting means includes a fluid inlet communicating with the chamber formed by said partition and the side of said filter chamber; whereby the fluid injected through said wire mesh enters said bed in said tangential direction.

17. A method of collecting first and second particles in a first and second chamber partially filled with particulate material, from a fluid containing a mixture of said first and second particles, said first particles having the property of being attracted by a first electrostatic charge, said second particles having the property of being attracted by a second electrostatic charge, said method comprising the steps of:
(a) introducing said fluid into said first chamber;
(b) developing said first charge on the contents of said first chamber so as to separate said first particles from said fluid;
(c) delivering said fluid from said fiirst chamber into said second chamber;
(d) developing said second charge on the contents of said second chamber so as to separate said second particles from said fluid;
(e) draining said fluid from said second chamber;
(f) introducing a cleaning fluid having a specific gravity which exceeds that of the contents of the chamber into said first and second chambers to remove said first and second particles therefrom, said cleaning fluid being ejected into each of said chambers simultaneously in two different flow paths, one being directed out-wardly from a central location and the other being directed generally tangentially to the walls of each chamber; and
(g) draining said cleaning fluid from said chambers.

18. A method as defined in claim 17, wherein said contents of said first chamber comprises a first bed of particles of a first chargeable polymer and said contents of said second chamber comprises a second bed of particles of a second chargeable polymer.

19. The method as defined in claim 17, wherein said outward ejection from said central location is along radial paths.

20. The method as defined in claim 19, wherein said radially outward ejection is accomplished so as to form an outwardly moving wall of fluid having the shape of a truncated cone.

21. In a filter device, means defining a fluid chamber having an inlet and an outlet, filter beads partially filling said chamber for removing particles from a first fluid delivered through said filter beads, and means for introducing a cleaning fluid into said filter beads simultaneously in an outward direction and in a direction generally tangential to the walls of said chamber, said cleaning fluid having a specific gravity which exceeds that of the filter beads.

22. The invention as defined in claim 21, wherein said filter means comprises a bed of filtering particles, said first fluid being delivered generally downwardly through said bed, and said cleaning fluid being delivered in a generally horizontal direction through said bed.

23. The invention as defined in claim 22, wherein said filtering particles have a specific density of about 70% of said first fluid.

24. The invention as defined in claim 22, wherein said first fluid comprises water and said filtering particles have a specific gravity not greater than 1.

25. A filter system as defined in claim 21, including pressure responsive means operable to actuate said introducing means when said filter means becomes clogged with said particles, said pressure responsive means being operable to sense an increase in said fluid pressure on the inlet side of said filter means caused by the latter assuming a clogged condition.

26. A filter system as defined in claim 25, including time control means operable to actuate said introducing means at predetermined time intervals.

27. A filter system as defined in claim 21, including a perforated, spiral, tubular member mounted within said chamber and disposed in said filter means, means connecting said tubular member ot a source of pressurized air and means for introducing said pressurized air into said tubular member to agitate the filter particles in said bed.

28. A filter system as defined in claim 18, and further including a second filter chamber with filtering means, said first fluid being delivered from said first filter chamber to said second filter chamber, means for introducing a cleaning fluid into said second filter chamber, and pressure responsive means operable to sense a pressure increase in either of said chambers caused by either of said filtering means assuming a clogged condition.

29. A filter system as defined in claim 28 including means for fluidly separating said first and second filter chambers before said cleaning fluid is introduced into either of said filter chambers.

30. A filter system as defined in claim 29 wherein said first and second filter chambers have individual outlets for discharging said cleaning fluid.

(References on following page)

References Cited

UNITED STATES PATENTS

| | | | |
|---|---|---|---|
| 629,942 | 8/1899 | Wanner | 210—284 X |
| 2,789,696 | 4/1957 | Jahning et al. | 210—284 X |
| 2,925,912 | 2/1960 | Clark | 210—138 X |
| 3,016,147 | 1/1962 | Cobb et al. | 210—275 |
| 3,214,247 | 10/1965 | Broughton | 210—284 X |
| 3,278,031 | 10/1966 | Rosaen | 210—106 |
| 3,424,674 | 1/1969 | Webber | 210—20 |

SAMIH N. ZAHARNA, Primary Examiner

U.S. Cl. X.R.

210—279, 282, 284